(12) United States Patent
Miyazono et al.

(10) Patent No.: US 12,515,516 B2
(45) Date of Patent: Jan. 6, 2026

(54) DRIVE UNIT FOR VEHICLE AND VEHICLE COMPRISING THE SAME

(71) Applicant: TOYOTA JIDOSHA KABUSHIKI KAISHA, Toyota (JP)

(72) Inventors: Hideaki Miyazono, Kasugai (JP); Junya Kobayashi, Ama (JP); Junichi Deguchi, Toyota (JP); Hironori Asaoka, Okazaki (JP); Kei Ohta, Toyota (JP); Sho Okazaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 231 days.

(21) Appl. No.: 18/503,730

(22) Filed: Nov. 7, 2023

(65) Prior Publication Data

US 2024/0149660 A1    May 9, 2024

(30) Foreign Application Priority Data

Nov. 9, 2022  (JP) ................. 2022-179826

(51) Int. Cl.
  *H02K 9/00* (2006.01)
  *B60K 11/02* (2006.01)
  *B60K 1/00* (2006.01)

(52) U.S. Cl.
  CPC ........ *B60K 11/02* (2013.01); *B60K 2001/003* (2013.01)

(58) Field of Classification Search
  CPC ... B60K 11/02; B60K 2001/003; Y02T 10/64; H02K 9/00; H02K 9/10; H02K 9/12
  USPC ........................................................ 903/952
  See application file for complete search history.

(56) References Cited

U.S. PATENT DOCUMENTS

| | | | |
|---|---|---|---|
| 5,024,287 A | 6/1991 | Okui et al. | |
| 7,637,336 B2* | 12/2009 | Enomoto | F16H 61/0009 180/69.1 |
| 7,948,125 B2* | 5/2011 | Woody | B60K 6/365 310/58 |
| 8,129,875 B2* | 3/2012 | Murata | H02K 3/24 310/59 |
| 8,653,704 B2* | 2/2014 | Atarashi | H02K 9/19 310/58 |
| 9,266,423 B2* | 2/2016 | Hoshinoya | B60K 6/48 |
| 10,270,314 B2* | 4/2019 | Matsuda | H02K 7/116 |
| 10,371,254 B2* | 8/2019 | Fukui | F16H 57/0439 |
| 10,443,459 B2* | 10/2019 | Okada | F01M 11/0004 |
| 10,808,831 B2* | 10/2020 | Ikeda | F16H 57/0436 |

(Continued)

FOREIGN PATENT DOCUMENTS

| | | |
|---|---|---|
| JP | 2719965 B2 | 2/1998 |
| JP | 2007-290580 A | 11/2007 |

(Continued)

*Primary Examiner* — Burton S Mullins
(74) *Attorney, Agent, or Firm* — Sughrue Mion, PLLC

(57) ABSTRACT

A drive unit for a vehicle may include a motor, a casing accommodating the motor, an electric pump unit attached to a lower part of the casing and configured to circulate heat medium within the casing and a filter unit attached to the lower part of the casing and configured to filter the heat medium. At least a part of the electric pump unit and at least a part of the filter unit each protrude outside the casing. Outside the casing, the filter unit is adjacent to the electric pump unit from a front in the vehicle.

16 Claims, 6 Drawing Sheets

(56) References Cited

U.S. PATENT DOCUMENTS 11,732,795 B2 * 8/2023 Ishikawa ............. F16H 57/0424
                                                          475/150
2007/0251229 A1    11/2007 Nakatsuka et al.

FOREIGN PATENT DOCUMENTS

| JP | 2012-55039 A | 3/2012 |
|---|---|---|
| JP | 2014-025439 A | 2/2014 |
| JP | 2020-174478 A | 10/2020 |
| JP | 2022-529723 A | 6/2022 |
| WO | 2020/219955 A1 | 10/2020 |

* cited by examiner

DRIVE UNIT FOR VEHICLE AND VEHICLE COMPRISING THE SAME

REFERENCE TO RELATED APPLICATION

This application claims priority from Japanese Patent Application No. 2022-179826 filed on Nov. 9, 2022. The entire content of the priority application is incorporated herein by reference.

BACKGROUND ART

The present disclosure relates to a drive unit for a vehicle and a vehicle comprising the same.

Japanese Patent Application Publication No. 2022-529723 describes a drive unit for a vehicle. The drive unit is mounted in a vehicle such as an electric vehicle, and configured to drive a pair of front wheels or a pair of rear wheels. The drive unit includes a motor, a casing accommodating the motor, and an electric pump unit configured to circulate heat medium within the casing.

DESCRIPTION

In the above drive unit, at least a part of the electric pump unit protrudes outside the casing. Accordingly, chipping stones from a road and/or foreign objects on the road may undesirably contact the electric pump unit. In particular, the electric pump unit is positioned on a lower part of the casing so that the heat medium within the casing can be effectively suctioned. Due to this, the electric pump unit could be hit strongly by the chipping stones and/or foreign objects as mentioned above, and thus the electric pump may be damaged. The present teachings provide an art configured to avoid or suppress such problem.

The present teachings may be embodied by a drive unit for a vehicle. The drive unit may comprise: a motor; a casing accommodating the motor; an electric pump unit attached to a lower part of the casing and configured to circulate heat medium within the casing; and a filter unit attached to the lower part of the casing and configured to filter the heat medium. At least a part of the electric pump unit and at least a part of the filter unit may each protrude outside the casing, and outside the casing, the filter unit may be adjacent to the electric pump unit from a front side in a front-rear direction of the vehicle.

In the above-mentioned configuration, the filter unit is adjacent to the electric pump unit from a front side in the front-rear direction of the vehicle. According to such configuration, the filter unit functions as a shield against the chipping stones and/or foreign objects as aforementioned so that the electric pump unit is protected.

DETAILED DESCRIPTION

Figure 1:
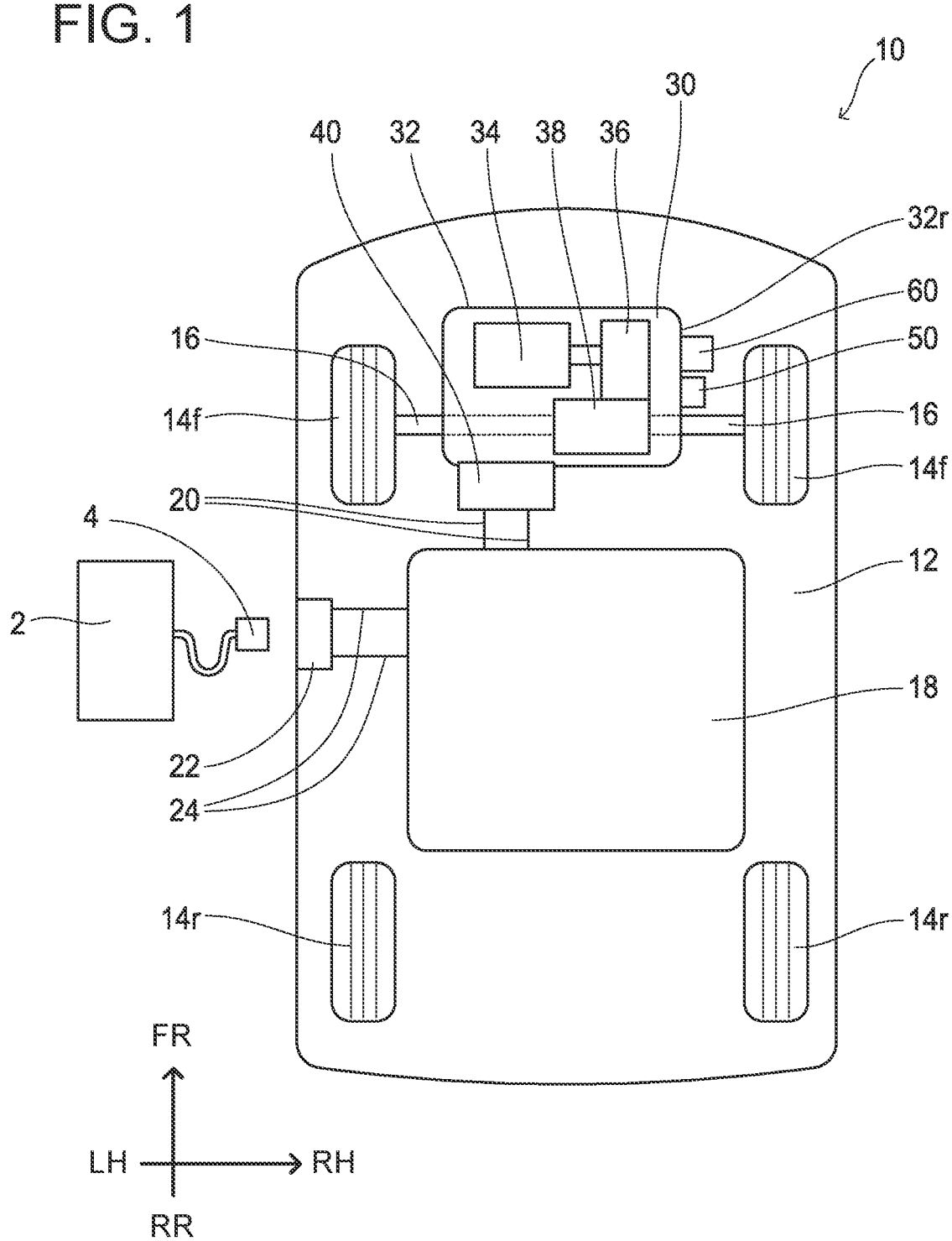
FIG. 1 schematically illustrates a configuration of a vehicle 10 according to an embodiment.

In some aspects of the present teachings, outside the casing, a lowest part of the filter unit may be located lower than a lowest part of the electric pump unit. According to such configuration, the filter unit can more effectively function as the shield as aforementioned.

In some aspects of the present teachings, outside the casing, both the electric pump unit and the filter unit may protrude from a sidewall of the casing leftward or rightward in the vehicle. In such configuration, since it is more likely that the chipping stones and/or foreign objects contact the electric pump unit, the filter unit can more effectively function as the shield as aforementioned.

In some aspects of the present teachings, outside the casing, a dimension of the filter unit protruding from the sidewall may be greater than a dimension of the electric pump unit protruding from the sidewall. According to such configuration, the filter unit can more effectively function as the shield as aforementioned.

In some aspects of the present teachings, the electric pump unit may have an electric connector outside the casing, the electric connector being configured connectable to and disconnectable from an electric wiring configured to supply power to the electric pump unit. According to such configuration, the connector, which is relatively prone to being damaged, can be protected with the filter unit.

In some aspects of the present teachings, the electric pump unit and the filter unit may be located lower than a rotation axis of the motor. The lower the electric pump unit and the filter unit are positioned, the effects of the art disclosed herein can more prominently be enjoyed.

In some aspects of the present teachings, the drive unit may further comprise a reduction gear train accommodated within the casing and mechanically connected to the motor. In this case, the electric pump unit and the filter unit may be located lower than a rotation axis of at least one gear of the reduction gear train. The lower the electric pump unit and the filter unit are positioned, the effects of the art disclosed herein can more prominently be enjoyed.

In some aspects of the present teachings, the drive unit may further comprise a differential accommodated within the casing and mechanically connected to the motor. In this case, the electric pump unit and the filter unit may be located lower than a rotation axis of the differential. The lower the electric pump unit and the filter unit are positioned, the effects of the art disclosed herein can more prominently be enjoyed.

In some aspects of the present teachings, an inlet pipe may be disposed inside the casing, the inlet pipe comprising a base end connected to the electric pump unit and a tip end configured to suction the heat medium within the casing. In this case, the tip end of the inlet pipe may be located lower than the base end of the inlet pipe. According to such configuration, no matter where the electric pump unit is, the electric pump unit can surely suction the heat medium remaining at the bottom within the casing.

In some aspects of the present teachings, a strainer may be disposed at the tip end of the inlet pipe. According to such configuration, the heat medium being suctioned by the electric pump unit can be filtered with the strainer.

In some aspects of the art disclosed herein, a filter member configured to filter the heat medium that has passed through the strainer may be disposed in the inlet pipe. According to such configuration, the heat medium being suctioned by the electric pump unit can further be filtered with the strainer.

In some aspects of the present teachings, a strainer may be disposed inside the casing, the strainer being connected to the electric pump unit via a filter member. In this case, at least a part of the strainer may extend in a direction oriented downward relative to the filter member. According to such configuration also, with the suctioning function for the heat medium of the electric pump unit sustained, the position of the electric pump unit can be freely changed.

The present teachings may be embodied as a vehicle. The vehicle may comprise a vehicle body; a plurality of wheels supporting the vehicle body; and the drive unit configured to drive at least one of the plurality of wheels. The drive unit may be any of the above-listed drive units. Outside the casing, the filter unit may be adjacent to the electric pump unit from a front side in a front-rear direction of the vehicle.

In some aspects of the present teachings, the plurality of wheels may comprise a pair of front wheels and a pair of rear wheels. In this case, the drive unit may be located in a front part of the vehicle body and configured to drive the pair of front wheels. In the vehicle in which the drive unit is positioned in a front part of the vehicle body, it is likely that the chipping stones and/or foreign objects may hit the electric pump unit. In such electric car, the art disclosed herein can be implemented advantageously.

In some aspects of the present teachings, the vehicle may further comprise a battery configured to supply electric power to the drive unit.

In some aspects of the present teachings, the battery may be configured rechargeable by an external charger. That is, the vehicle may be a so-called battery electric vehicle. Alternatively, as another aspect, the vehicle may be configured such that the battery is not rechargeable by an external charger like a hybrid electric vehicle or fuel cell electric vehicle.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved drive units for vehicles, as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

With reference to drawings, a vehicle 10 according to an embodiment will be described. The vehicle 10 of the embodiment is a so-called electric vehicle. The electric vehicle herein mentioned broadly signifies a vehicle having a motor configured to drive wheel(s), and for example may include a battery electric vehicle, a hybrid electric vehicle, a plug-in hybrid electric vehicle, a fuel cell electric vehicle.

A direction FR in the drawings signifies frontward in a front-rear direction of the vehicle 10 and a direction RR signifies rearward in the front-rear direction of the vehicle 10. A direction LH signifies leftward in a left-right direction of the vehicle 10 and a direction RH signifies rightward in the left-right direction of the vehicle 10. A direction UP signifies upward in an up-down direction of the vehicle 10 and a direction DW signifies downward in the up-down direction of the vehicle 10. In the present teachings, frontward/in front of, rearward/behind, leftward/left, rightward/right, upward/upper/above, and downward/lower/below in the vehicle 10 may be simply denoted frontward/in front of, rearward/behind, leftward/left, rightward/right, upward/upper/above, and downward/lower/below (without mentioning the vehicle 10).

As shown in FIG. 1, the vehicle 10 comprises a vehicle body 12 and pluralities of wheels 14*f*, 14*r* which support the vehicle body 12. The pluralities of wheels 14*f*, 14*r* are each mounted rotatably to the vehicle body 12. Although not particularly limited, the pluralities of wheels 14*f*, 14*r* include a pair of front wheels 14*f* disposed at a front part of the vehicle body 12 and a pair of rear wheels 14*r* disposed at a rear part of the vehicle body 12. Here, the number and arrangement of the pluralities of wheels 14*f*, 14*r* are not particularly limited.

The vehicle 10 further comprises a drive unit 30. The drive unit 30 is configured to drive at least one of the pluralities of wheels 14*f*, 14*r*. Although not particularly limited, the drive unit 30 in the present embodiment is disposed in the front part in the vehicle body 12, and configured to drive the pair of front wheels 14*f* The drive unit 30 is disposed between the pair of front wheels 14*f*, and connected respectively to each of the front wheels 14*f* via a pair of drive shafts 16. Alternatively, as another embodiment, the drive unit 30 may be disposed in a rear part of the vehicle body 12, and may be configured to drive the pair of rear wheels 14*r*.

The vehicle 10 further comprises a battery 18 and a charging inlet 22. The battery 18 is a power source for supplying electric power to the drive unit 30, and connected to the drive unit 30 via a power cable 20. The battery 18 has a plurality of secondary battery cells such as lithium-ion battery cells incorporated therein and is configured repeatedly rechargeable. The charging inlet 22 is configured to detachably receive a charging plug 4 of a charger 2. The charging inlet 22 is connected to the battery 18 via a charging circuit 24. Due to this, the battery 18 is configured rechargeable by the external charger 2.

Hereafter, the drive unit 30 will be described in detail. The drive unit 30 comprises a casing 32, a motor 34, and a power converter 40. The casing 32 is an outer shell for the drive unit 30 and constituted of metal, for example. An inside of the casing 32 is configured such that cooling oil circulates for cooling and lubrication purposes. The cooling oil in the present embodiment is an example of heat medium in the art disclosed herein.

The motor 34 is accommodated within the casing 32. The motor 34 is an electric motor and also a prime mover in the drive unit 30. Electric power is supplied from the battery 18 to the motor 34 via the power converter 40. The power converter 40 is configured to convert direct current supplied from the battery 18 to alternate current which is to be supplied to the motor 34. A specific configuration of the motor 34 is not limited in particular. For example, the motor 34 may be a permanent magnet motor (PM motor), and may be an induction motor. Although this is an example, the motor 34 of the present embodiment is an interior permanent magnet motor (IPM motor) having a rotor with permanent magnets fixed.

The drive unit 30 further comprises a reduction gear train 36 and a differential 38. The reduction gear train 36 is accommodated within the casing 32 and mechanically connected to the motor 34. The reduction gear train 36 has a plurality of gears and thus amplifies torque outputted by the motor 34. The differential 38 is accommodated within the casing 32, and mechanically connected with the motor 34 through the reduction gear train 36. Due to this, the torque outputted by the motor 34 is amplified by the reduction gear train 36 and is then distributed to the pair of front wheels 14f by the differential 38.

A specific configuration of the reduction gear train 36 is not particularly limited.

Figure 2:
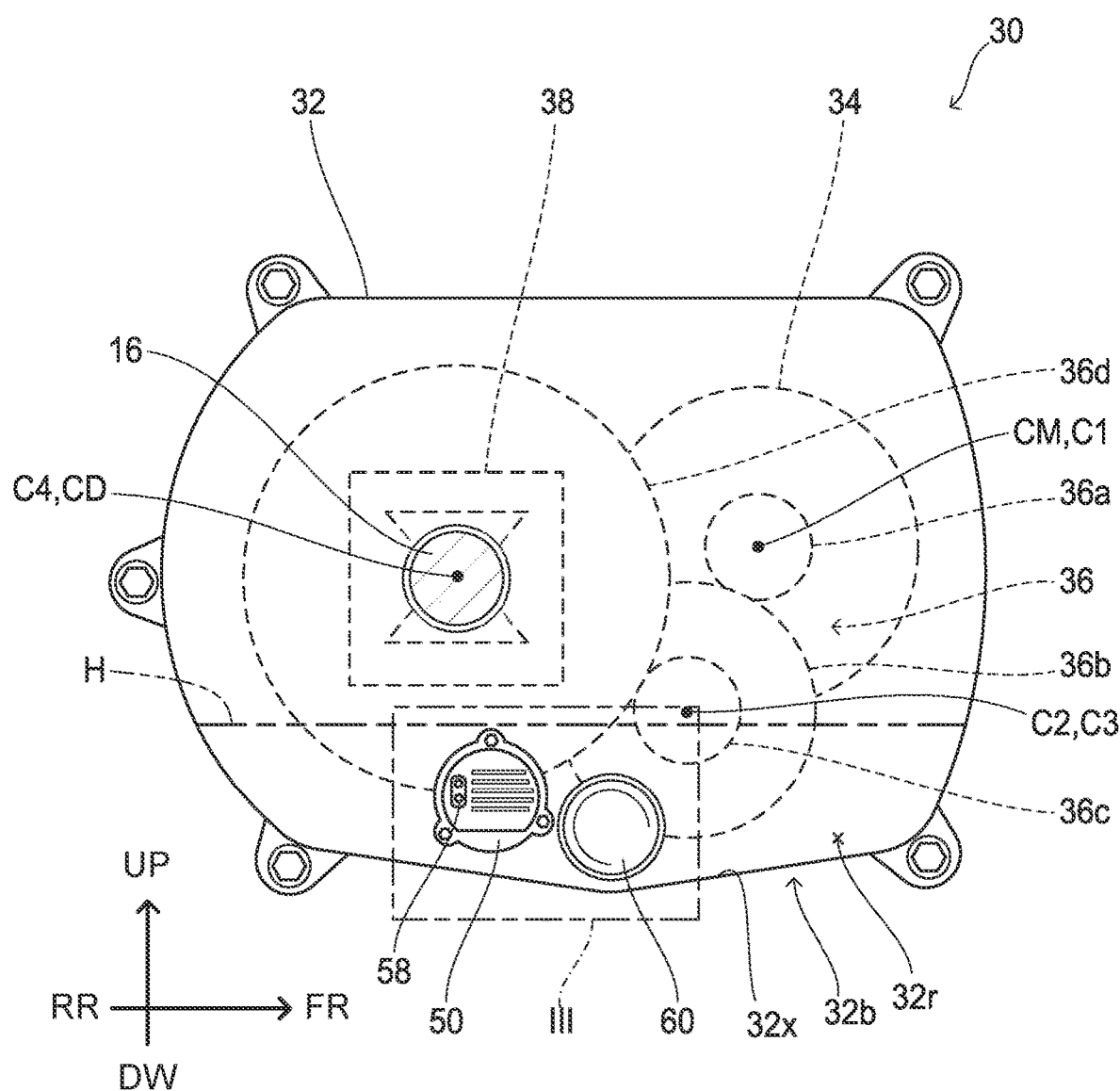
FIG. 2 illustrates a lateral view of a drive unit 30.

Although this is an example, as shown in FIG. 2, the reduction gear train 36 in the present embodiment comprises a first gear 36a, a second gear 36b, a third gear 36c, and a fourth gear 36d. The first gear 36a is fixed to the motor 34 and is directly driven by the motor 34. The first gear 36a is disposed coaxially with the motor 34, and a rotary axis C1 of the first gear 36a is on the same line with a rotary axis CM of the motor 34. The second gear 36b meshes with the first gear 36a. A diameter of the second gear 36b is larger than a diameter of the first gear 36a. Due to this, the first gear 36a and the second gear 36b constitute a first reduction gear train.

The third gear 36c is fixed to the second gear 36b, and configured to rotate integrally with the second gear 36b. The third gear 36c is disposed coaxially with the second gear 36b, and a rotary axis C3 of the third gear 36c is on the same line with a rotary axis C2 of the second gear 36b. A diameter of the third gear 36c is smaller than a diameter of the second gear 36b. The fourth gear 36d meshes with the third gear 36c. A diameter of the fourth gear 36d is greater than a diameter of the third gear 36c. Due to this, the third gear 36c and the fourth gear 36d constitute a second reduction gear train.

A specific configuration of the differential 38 is not particularly limited. Although this is an example, the differential 38 of the present embodiment is fixed to the fourth gear 36d of the reduction gear train 36, and is configured to rotate integrally with the fourth gear 36d. The differential 38 is disposed coaxially with the fourth gear 36d, and a rotary axis CD of the differential 38 is on the same line with a rotary axis C4 of the fourth gear 36d. The differential 38 is connected to each of the front wheels 14f via the pair of drive shafts 16. Here, alternatively as another embodiment, the drive unit 30 may not comprise the reduction gear train 36. In this case, the differential 38 may be directly connected to the motor 34. Additionally or alternatively, the drive unit 30 may not comprise the differential 38. In this case, the motor 34 or the reduction gear train 36 may be directly connected to the pair of drive shafts 16.

As shown in FIGS. 1 to 4, the drive unit 30 further comprises an electric pump unit 50 and a filter unit 60. The electric pump unit 50 is attached to a lower part of the casing 32. The electric pump unit 50 is configured to suction the cooling oil remaining in the lower part of the casing 32 and pump the same to several sites in the casing 32. Due to this, the cooling oil circulates inside the casing 32. The electric pump unit 50 is located below a liquid level H of the cooling oil remaining in the lower part in the casing 32. Although not particularly limited, the electric pump unit 50 of the present embodiment is located on a right sidewall 32r of the casing 32, and a part of the electric pump unit 50 protrudes rightward from the right sidewall 32r of the casing 32.

The filter unit 60 is attached to the lower part of the casing 32 and is adjacent to the electric pump unit 50. The filter unit 60 is configured to filter the cooling oil circulating within the casing and remove foreign matters in the cooling oil. The filter unit 60 is also located below the liquid level H of the cooling oil. Although not particularly limited, the filter unit 60 of the present embodiment is located on the right sidewall 32r of the casing 32, and protrudes rightward from the right sidewall 32r of the casing 32, as is similar to the electric pump unit 50. Alternatively, as another embodiment, the electric pump unit 50 and the filter unit 60 may not be limited to being on the right sidewall 32r, but may be arranged on another spot of the casing 32, such as a left sidewall.

The filter unit 60 is located in front of the electric pump unit 50 and thus is adjacent to the electric pump unit 50 from front. According to such configuration, the filter unit 60 serves as a shield against a chipping stone 100 (see FIG. 3) jumping from a road and an obstacle on the road. Due to this, the electric pump unit 50 is protected from contacts with the chipping stone 100 and/or obstacle. In particular, the electric pump unit 50 comprises a connector 58 located outside the casing 32. This connector 58 is configured to receive power wiring for supplying power to the electric pump unit 50. If the chipping stone 100 and/or obstacle contact the connector 58, the electric pump unit 50 might become incapable of operating. According to the configuration of the present embodiment, the connector 58 of the electric pump unit 50 can also be protected by the filter unit 60.

Figure 3:
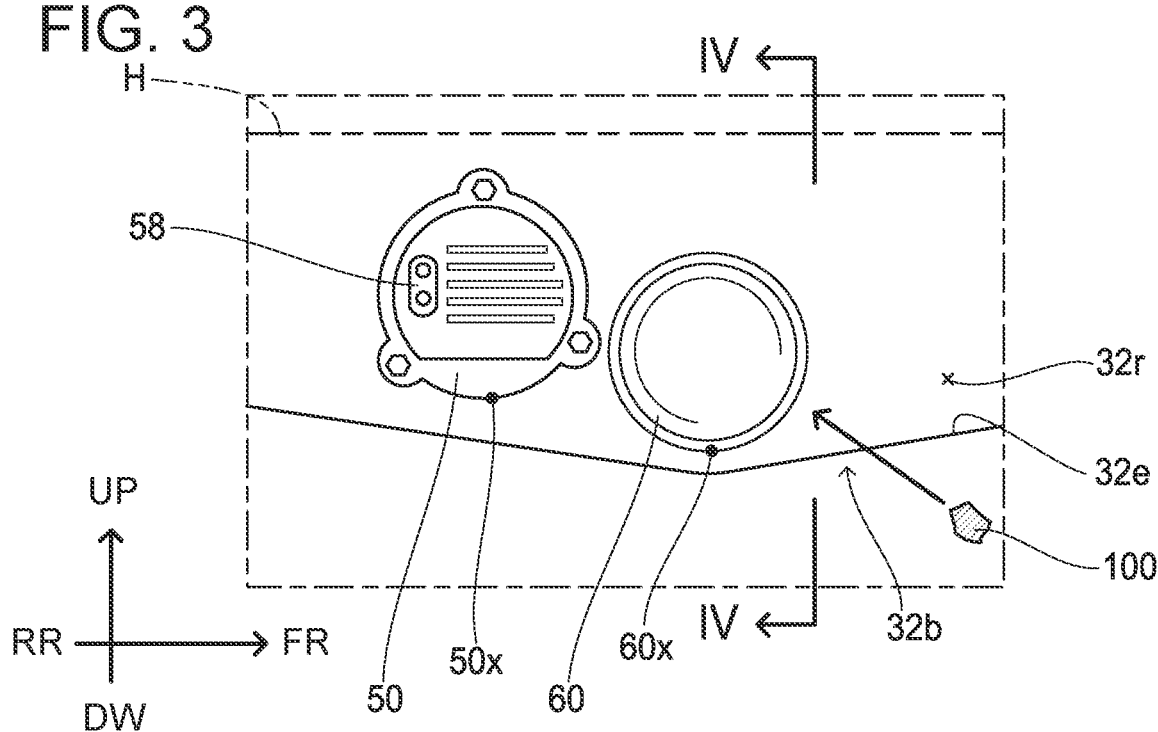
FIG. 3 illustrates an enlarged view of a section III in FIG. 2.
Figure 4:
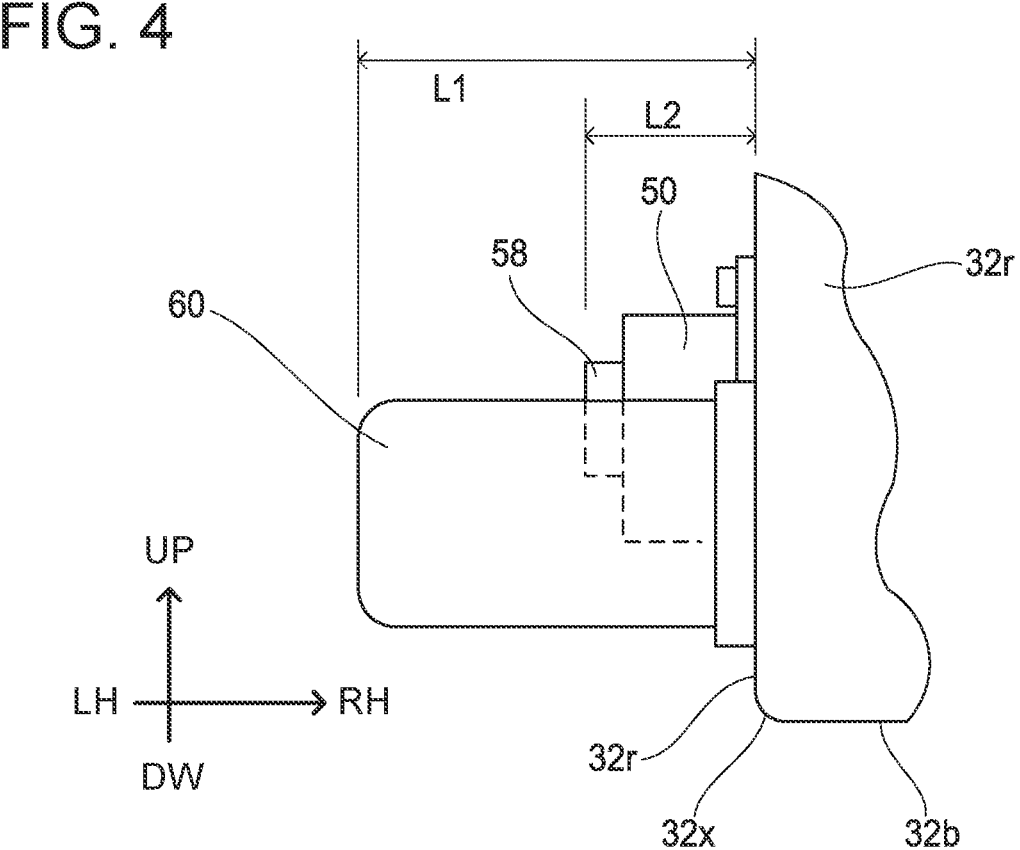
FIG. 4 illustrates a cross-sectional view taken along a line IV-IV in FIG. 3.

As shown in FIG. 3, in the drive unit 30 of the present embodiment, outside the casing 32, a lowest part 60x of the filter unit 60 is located lower than a lowest part 50x of the electric pump unit 50. In addition, as shown in FIG. 4, outside the casing 32, a dimension L1 which the filter unit 60 protrudes from the right sidewall 32r is greater than a dimension L2 which the electric pump unit 50 protrudes from the right sidewall 32r. According to such configuration, the filter unit 60 can serve as the shield more effectively.

As aforementioned, the electric pump unit 50 and the filter unit 60 are attached to the lower part of the casing 32. More in detail, as shown in FIGS. 3 and 4, the electric pump unit 50 and the filter unit 60 are arranged along a lower edge 32x of the right sidewall 32r of the casing 32. In the casing 32, the lower edge 32x of the right sidewall 32r is located on a boundary between the right sidewall 32r and a bottom wall 32b, and thus corresponds to a lowest part of the casing 32. Such arrangement as above is not limiting however, the electric pump unit 50 and the filter unit 60 simply need to be on the lower part of the casing 32. For example, as shown in FIG. 2, the electric pump unit 50 and the filter unit 60 may be located lower than the rotary axis CM of the motor 34. Alternatively, the electric pump unit 50 and the filter unit 60 may be located lower than the rotary axes C1 to C4 of all the gears 36a-36d of the reduction gear train 36. Alternatively, the electric pump unit 50 and the filter unit 60 may be located lower than the rotary axis CD of the differential 38.

Figure 5:
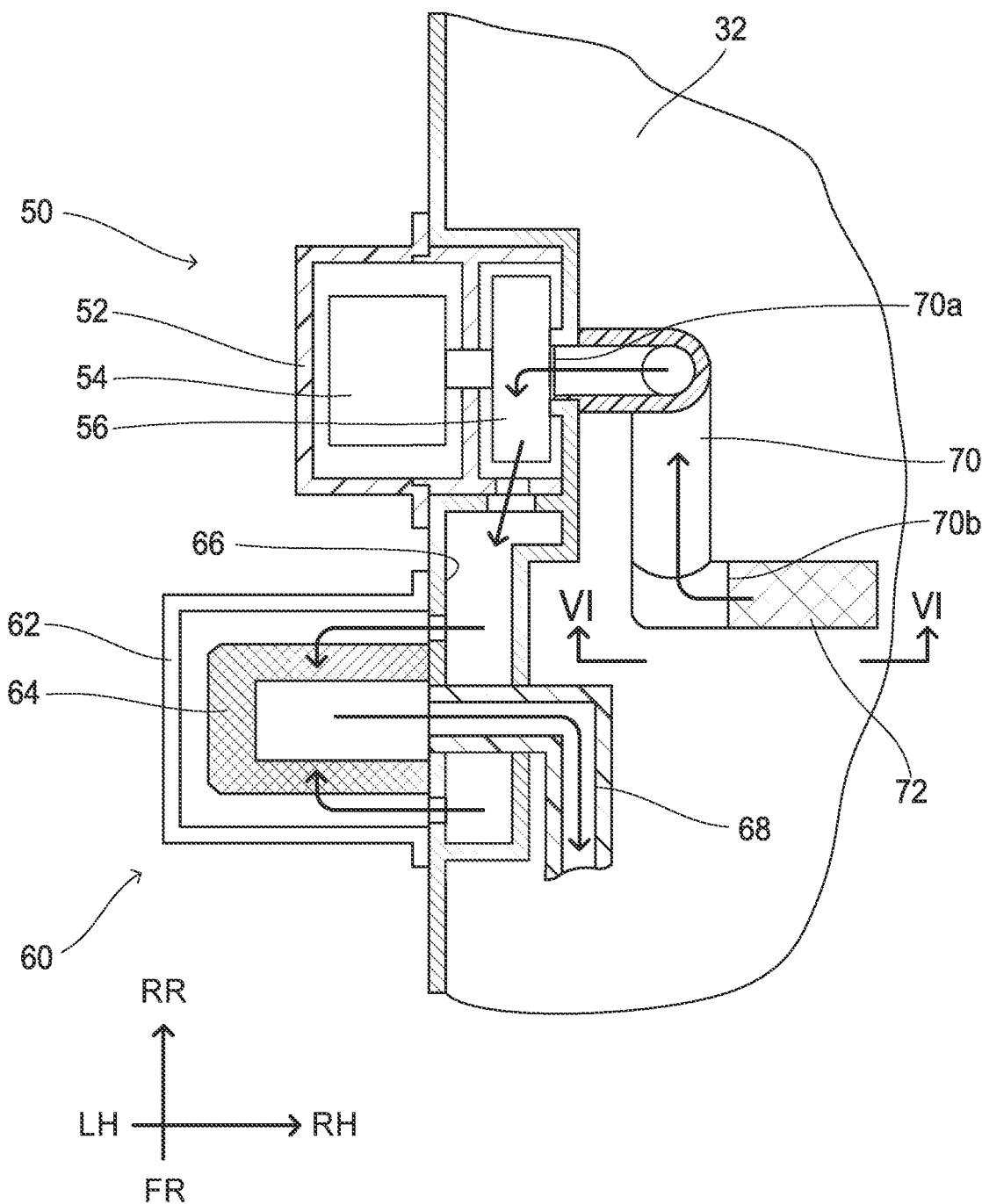
FIG. 5 schematically illustrates an internal structure of the drive unit 30 in relation to an electric pump unit 50 and a filter unit 60.
Figure 6:
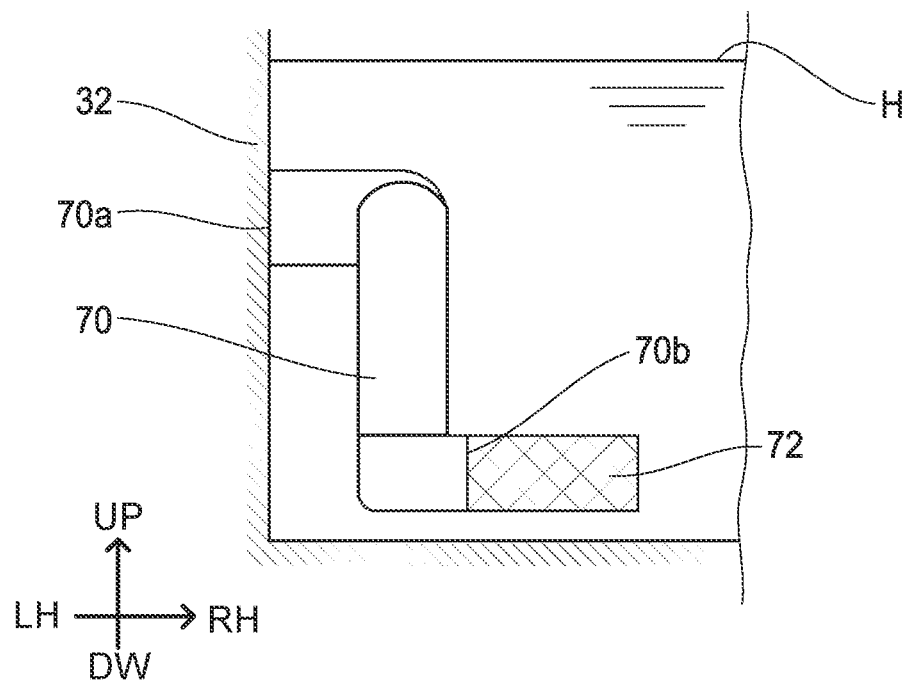
FIG. 6 illustrates a cross-sectional view taken along a line VI-VI in FIG. 5.

Next, with reference to FIGS. 5 and 6, a specific example of a structure including the electric pump unit 50 and the filter unit 60 will be described. The electric pump unit 50 comprises a pump housing 52, a pump motor 54, and a pump rotor 56. The pump motor 54 and the pump rotor 56 are accommodated within the pump housing 52. The pump motor 54 is a small type of electric motor, and a prime mover in the electric pump unit 50. The pump motor 54 is mechanically connected to the pump rotor 56 and is configured to drive the pump rotor 56 to rotate. When the pump rotor 56 rotates, the cooling oil remaining in the casing 32 is suctioned by the electric pump unit 50. The suctioned cooling oil is delivered by pressure from the electric pump unit 50 to the filter unit 60 through a first oil flow path 66. Although not particularly limited, the first oil flow path 66 is integrated with the casing 32. Here, the first oil flow path 66 may be a component independent of the casing 32, and thus may be constituted of resin material, for example.

The filter unit 60 comprises a filter housing 62 and a filter material 64 accommodated within the filter housing 62. The filter material 64 is constituted of a porous material, for example. The filter unit 60 is configured such that the cooling oil delivered by pressure from the electric pump unit 50 passes through the filter material 64. Due to this, the cooling oil is filtered and thus foreign matters are removed from the cooling oil. The cooling oil which passed through the filter material 64 is supplied to another site in the drive unit 30 such as an oil cooler (not shown) through a second oil flow path 68. The second oil flow path 68 is a component independent of the casing 32, and is constituted of a resin material. However, the second oil flow path 68 may be integrated with the casing 32.

The inlet pipe 70 is disposed in the casing 32. The inlet pipe 70 comprises a base end 70a and a tip end 70b, and is a tubular member extending from the base end 70a to the tip end 70b. The base end 70a of the inlet pipe 70 is connected to the electric pump unit 50 while the tip end 70b of the inlet pipe 70 is immersed below the liquid level H of the cooling oil remaining in the casing 32. Due to this, when the electric pump unit 50 starts operating, the cooling oil remaining in the casing 32 is suctioned through the tip end 70b of the inlet pipe 70. The suctioned cooling oil is delivered through the inlet pipe 70 to the electric pump unit 50.

The tip end 70b of the inlet pipe 70 is located lower than the base end 70a of the inlet pipe 70. According to such configuration, no matter where the electric pump unit 50 is, the electric pump unit 50 can surely suction the cooling oil from a lower spot in the casing 32. In addition, the tip end 70b of the inlet pipe 70 is disposed more on a front side than the base end 70a of the inlet pipe 70. This is because the lowest spot in the casing 32 is located more on the front side than the electric pump unit 50.

Figure 7:
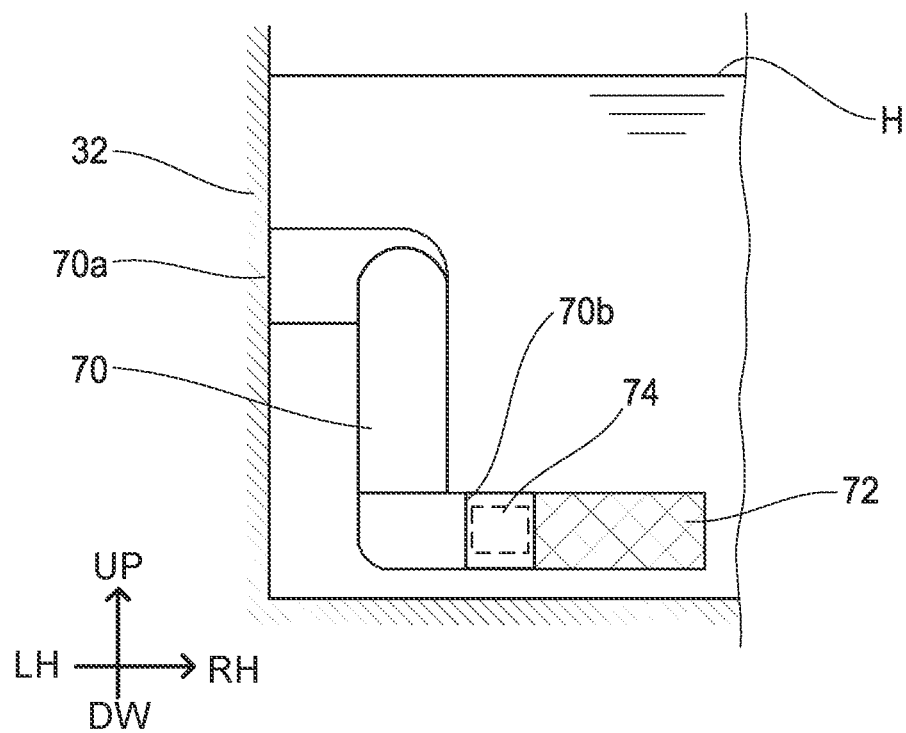
FIG. 7 illustrates a modification in which a filter member 74 is attached to an inlet pipe 70.

A strainer 72 is attached to the tip end 70b of the inlet pipe 70. The strainer 72 is constituted of metal mesh, for example. The cooling oil is filtered by the strainer 72 before it is suctioned by the inlet pipe 70. Due to this, a relatively large foreign matter among the foreign matters contained in the cooling oil is caught by the strainer 72. Here, as shown in FIG. 7, the inlet pipe 70 may comprise a small type of filter member 74. Although this is an example, the filter member 74 is located between the strainer 72 and the tip end 70b of the inlet pipe 70. The filter member 74 is finer than the strainer 72, and thus is able to capture foreign matters which passed through the strainer 72, among the foreign matters contained in the cooling oil. Here, the filter member 74 may be disposed at any spot of the inlet pipe 70 as long as the filter member 74 is interposed between the strainer 72 and the electric pump unit 50.

Figure 8:
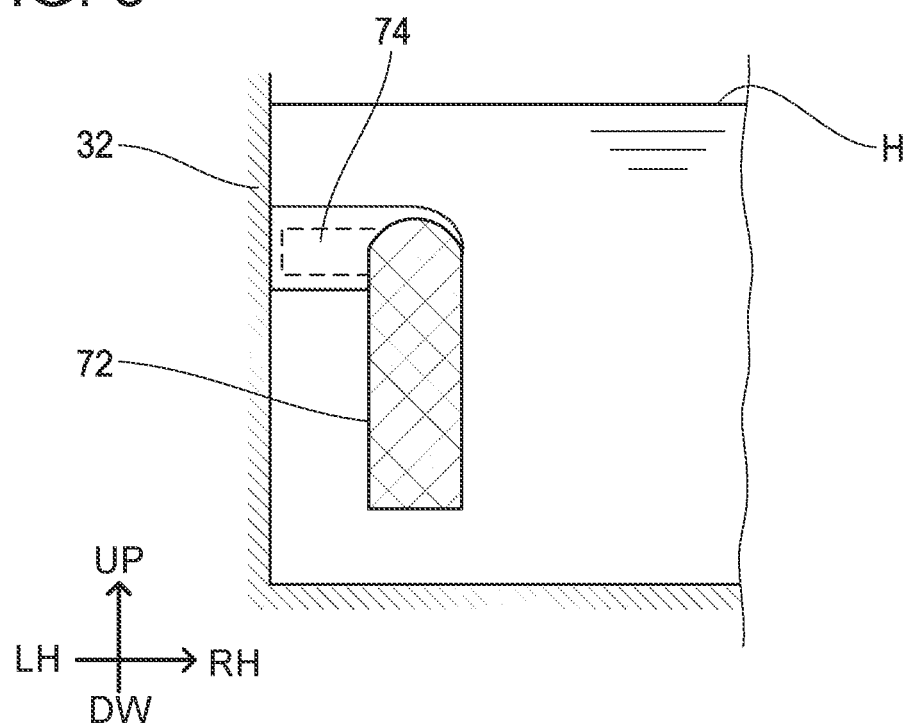
FIG. 8 illustrates another modification in which the inlet pipe 70 is omitted.

As shown in FIG. 8, the drive unit 30 does not necessarily need to comprise the inlet pipe 70. That is, the filter member 74 may be connected to the electric pump unit 50 without intervention of the inlet pipe 70. In this case, the strainer 72 may not be located coaxially with the electric pump unit 50 but may extend in a direction oriented downward relative to the filter member 74. When a part or an entirety of the strainer 72 extends in the direction oriented downward relative to the filter member 74, the strainer 72 can be arranged below the electric pump unit 50. Due to this, the arrangement of the electric pump unit 50 can be changed while the suctioning ability for the cooling oil of the electric pump unit 50 is maintained. In a modification shown in FIG. 8, the filter member 74 may further be omitted. That is, the strainer 72 may be connected to the electric pump unit 50 without intervention of the filter member 74. In this case also, a part or an entirety of the strainer 72 may extend in the direction oriented downward relative to the electric pump unit 50.

What is claimed is:

1. A drive unit for a vehicle, the drive unit comprising:
a motor;
a casing accommodating the motor;
an electric pump unit attached to a lower part of the casing and configured to circulate heat medium within the casing; and
a filter unit attached to the lower part of the casing and configured to filter the heat medium,
wherein
at least a part of the electric pump unit and at least a part of the filter unit each protrude outside the casing, and
outside the casing, the filter unit is adjacent to the electric pump unit from a front side in a front-rear direction of the vehicle.

2. The drive unit according to claim 1, wherein, outside the casing, a lowest part of the filter unit is located lower than a lowest part of the electric pump unit.

3. The drive unit according to claim 1, wherein, outside the casing, both the electric pump unit and the filter unit protrude from a sidewall of the casing leftward or rightward in the vehicle.

4. The drive unit according to claim 3, wherein, outside the casing, a dimension of the filter unit protruding from the sidewall is greater than a dimension of the electric pump unit protruding from the sidewall.

5. The drive unit according to claim 1, wherein the electric pump unit has an electric connector outside the casing, the electric connector being configured connectable to and disconnectable from an electric wiring configured to supply power to the electric pump unit.

6. The drive unit according to claim 1, wherein the electric pump unit and the filter unit are located lower than a rotation axis of the motor.

7. The drive unit according to claim 1, further comprising a reduction gear train accommodated within the casing and mechanically connected to the motor,
wherein the electric pump unit and the filter unit are located lower than a rotation axis of at least one gear of the reduction gear train.

8. The drive unit according to claim 1, further comprising a differential accommodated within the casing and mechanically connected to the motor, wherein the electric pump unit and the filter unit are located lower than a rotation axis of the differential.

9. The drive unit according to claim 1, wherein
an inlet pipe is disposed inside the casing, the inlet pipe comprising a base end connected to the electric pump unit and a tip end configured to suction the heat medium within the casing, and
the tip end of the inlet pipe is located lower than the base end of the inlet pipe.

10. The drive unit according to claim 9, wherein a strainer is disposed at the tip end of the inlet pipe.

11. The drive unit according to claim 10, wherein a filter member configured to filter the heat medium that has passed through the strainer is disposed in the inlet pipe.

12. The drive unit according to claim 1, wherein
a strainer is disposed inside the casing, the strainer being connected to the electric pump unit via a filter member, and
at least a part of the strainer extends in a direction oriented downward relative to the filter member.

13. A vehicle, comprising:
a vehicle body;
a plurality of wheels supporting the vehicle body; and
the drive unit according to claim 1, the drive unit being configured to drive at least one of the plurality of wheels,
wherein, outside the casing, the filter unit is adjacent to the electric pump unit a front side in a front-rear direction of the vehicle.

14. The vehicle according to claim 13, wherein
the plurality of wheels comprises a pair of front wheels and a pair of rear wheels, and
the drive unit is located in a front part of the vehicle body and configured to drive the pair of front wheels.

15. The vehicle according to claim 13, further comprising a battery configured to supply electric power to the drive unit.

16. The vehicle according to claim 15, wherein the battery is configured rechargeable by an external charger.

* * * * *